(No Model.) 8 Sheets—Sheet 1.
J. NUTT.
MACHINE FOR APPLYING CLASPS TO HAT WIRES.
No. 379,876. Patented Mar. 20, 1888.
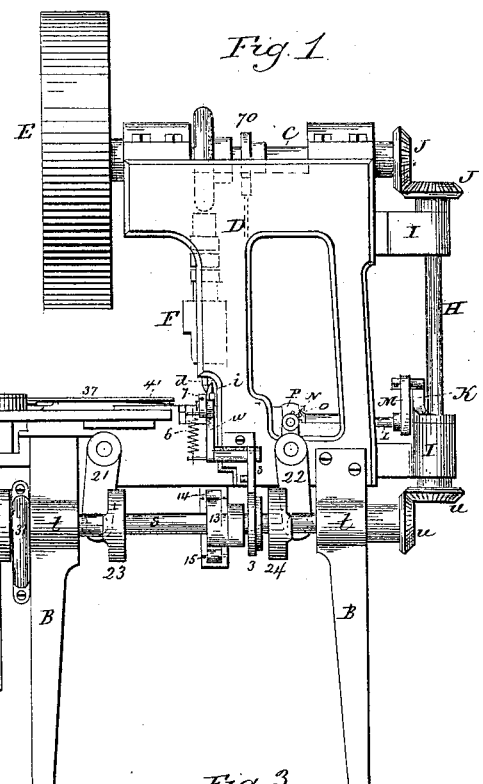

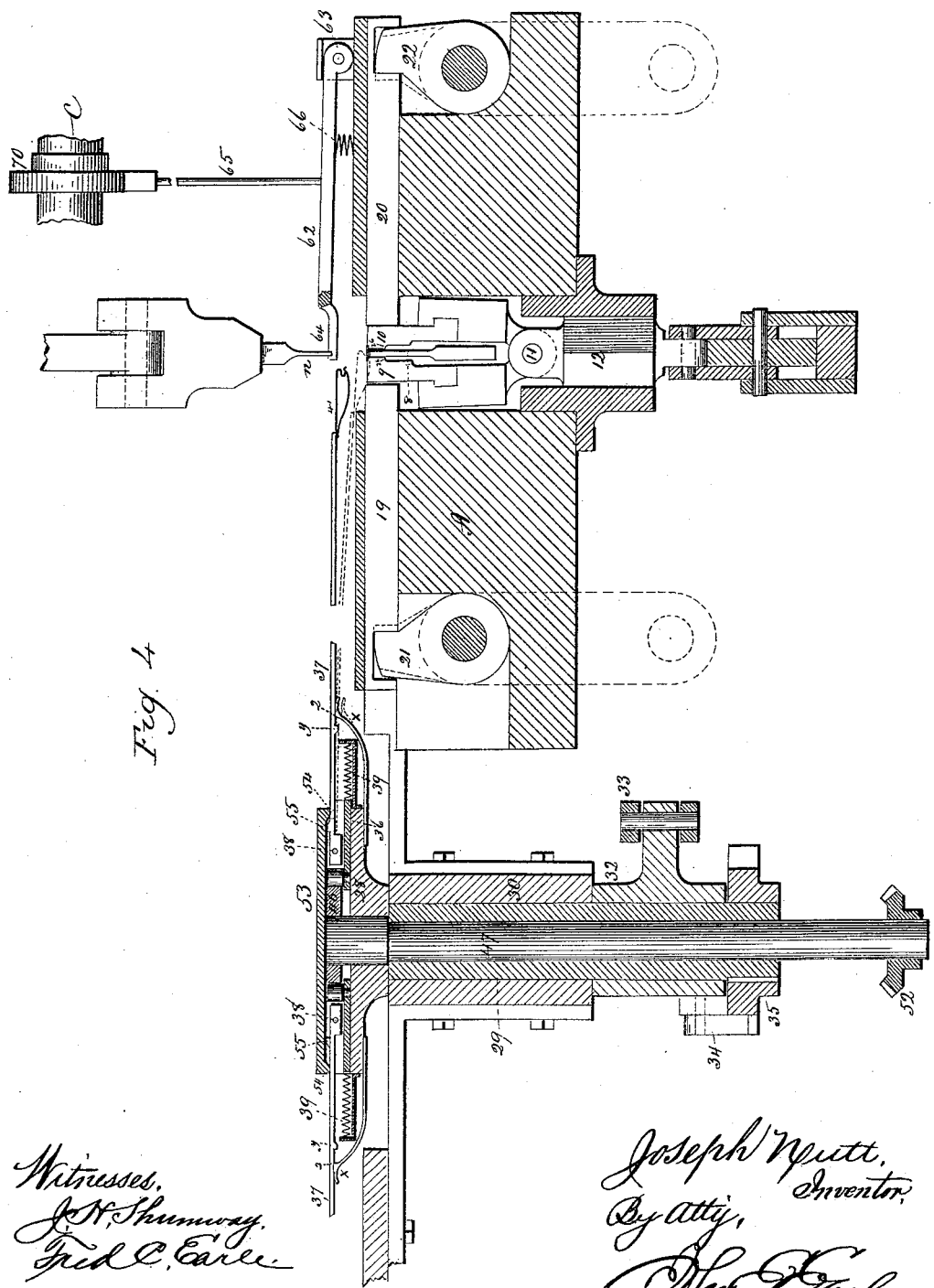

(No Model.) 8 Sheets—Sheet 3.
J. NUTT.
MACHINE FOR APPLYING CLASPS TO HAT WIRES.
No. 379,876. Patented Mar. 20, 1888.
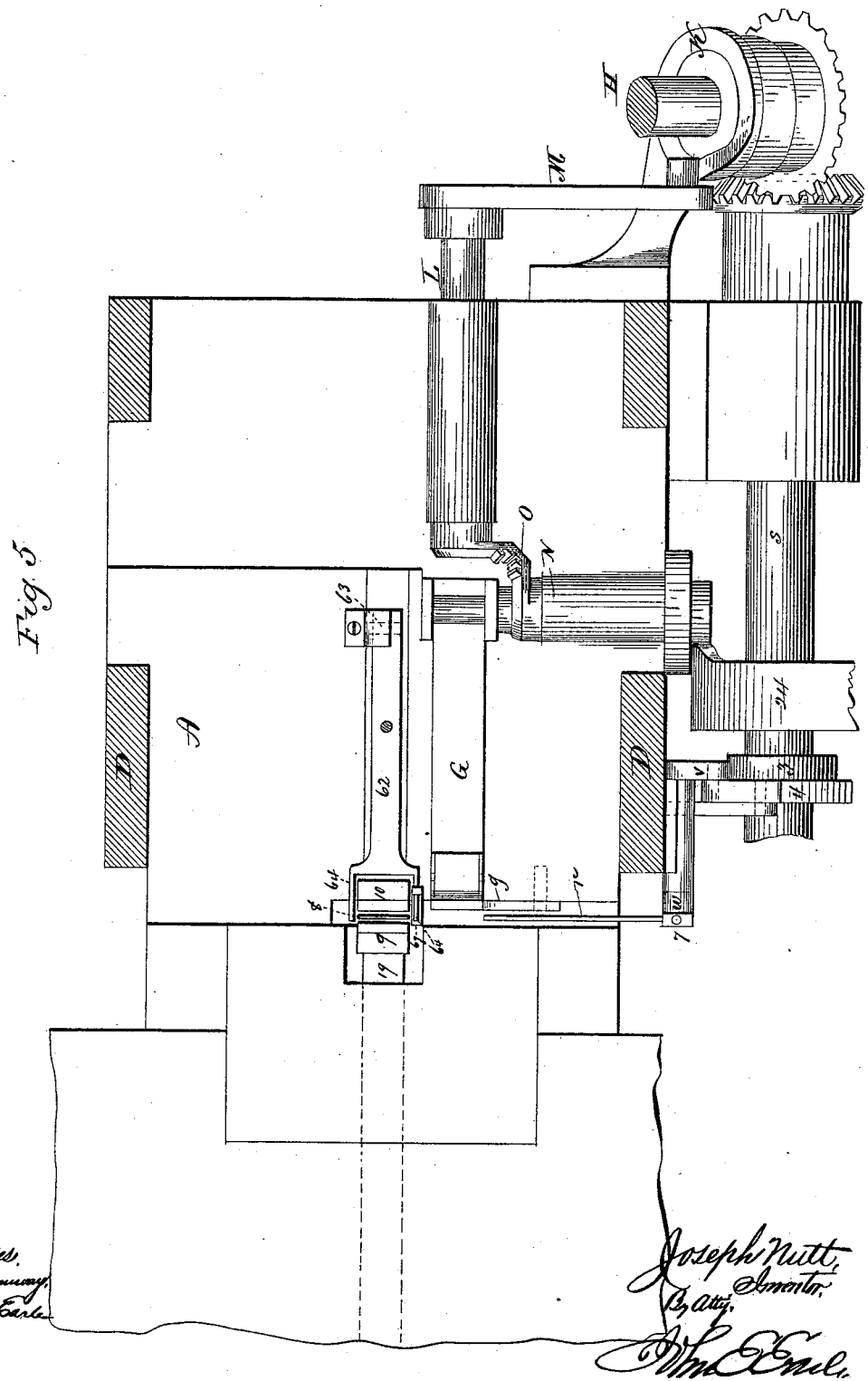

(No Model.) 8 Sheets—Sheet 4.
J. NUTT.
MACHINE FOR APPLYING CLASPS TO HAT WIRES.
No. 379,876. Patented Mar. 20, 1888.
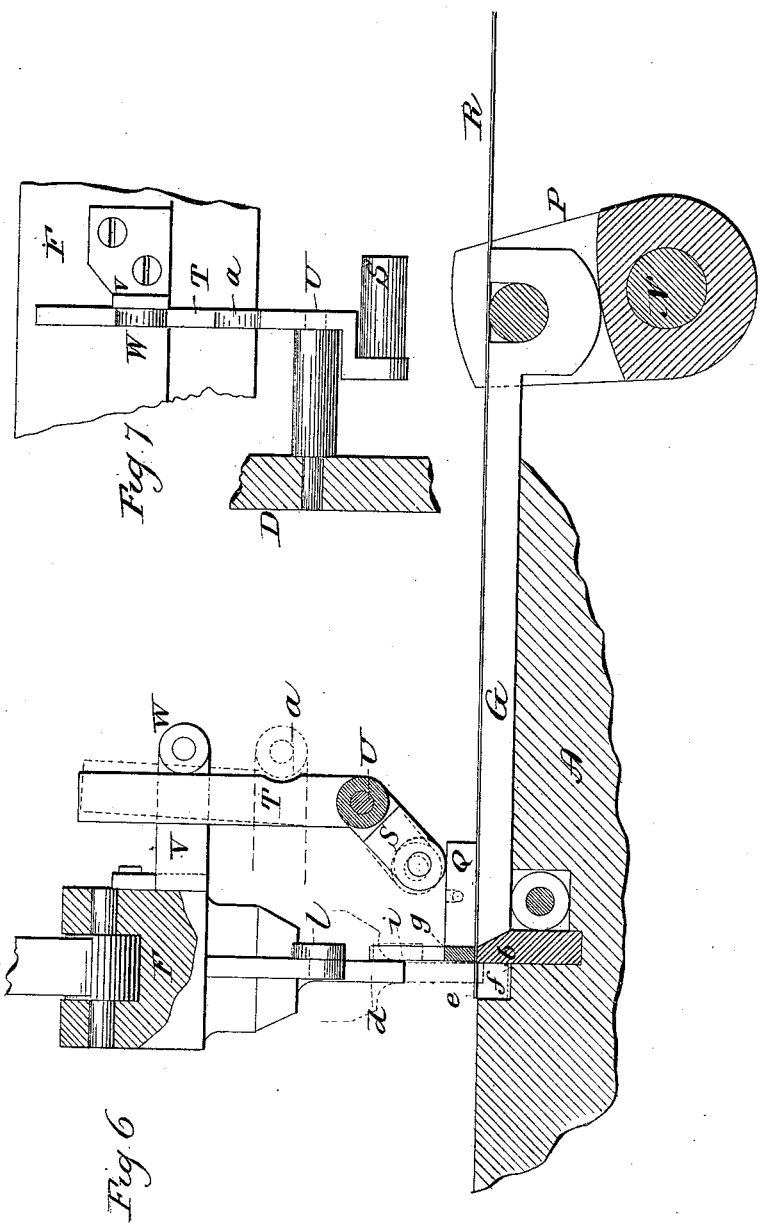

(No Model.) 8 Sheets—Sheet 5.
J. NUTT.
MACHINE FOR APPLYING CLASPS TO HAT WIRES.
No. 379,876. Patented Mar. 20, 1888.
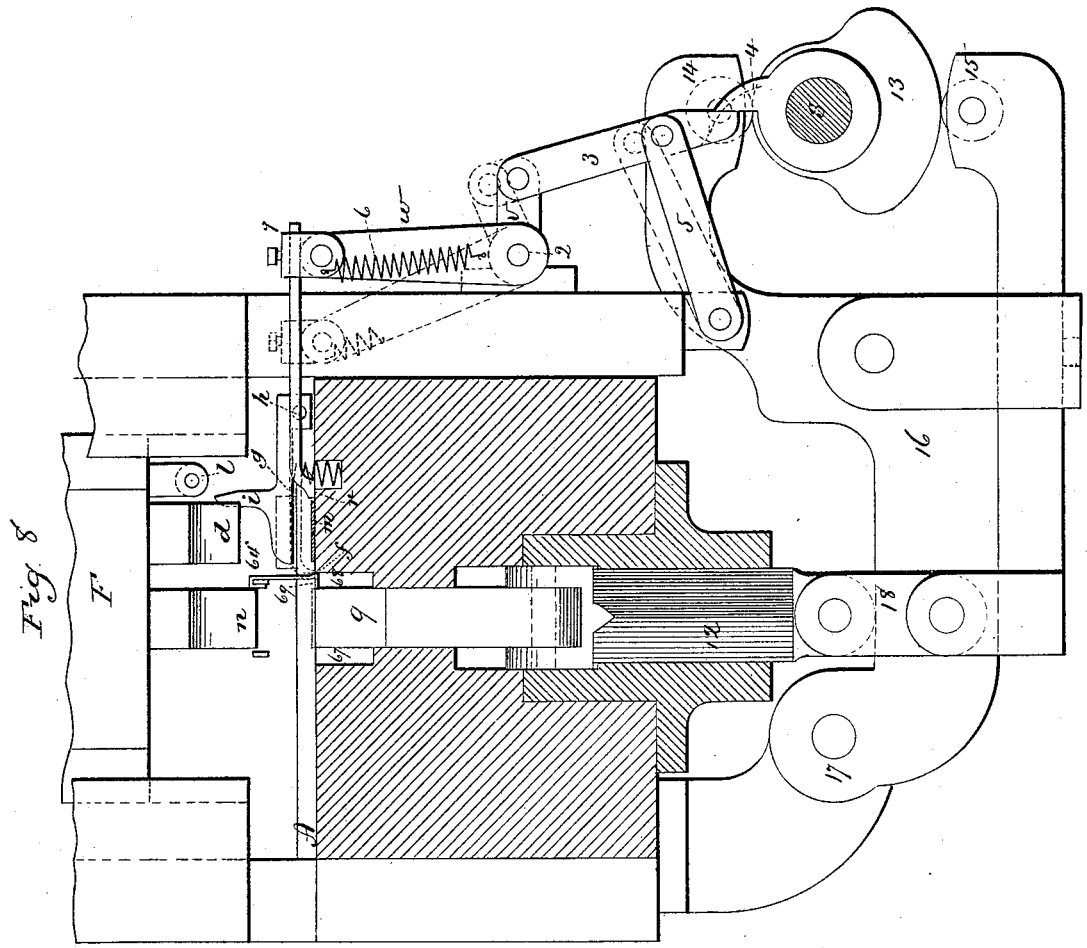

(No Model.) 8 Sheets—Sheet 6.
J. NUTT.
MACHINE FOR APPLYING CLASPS TO HAT WIRES.
No. 379,876. Patented Mar. 20, 1888.
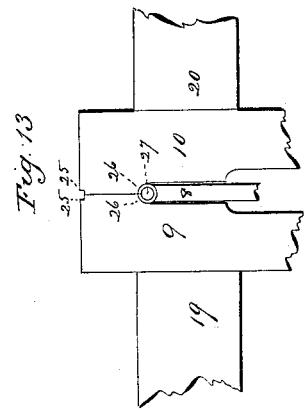
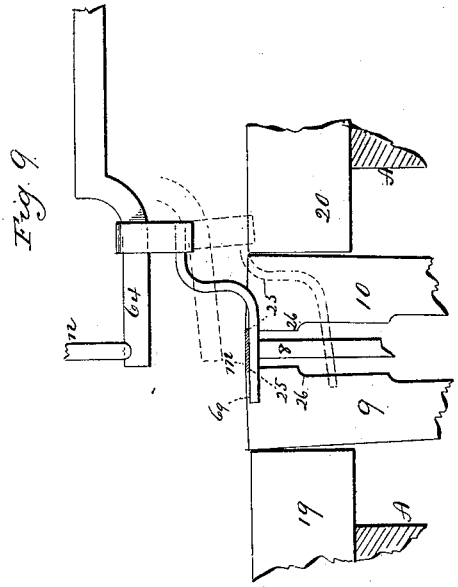
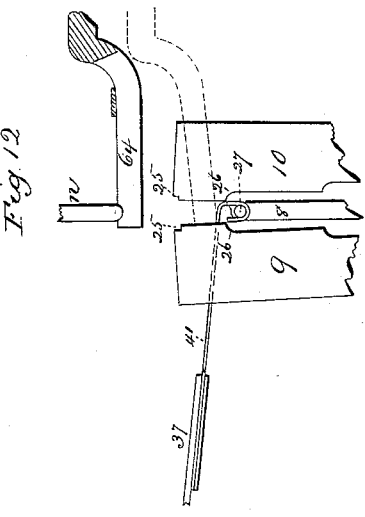
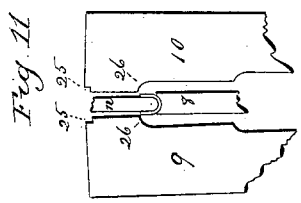
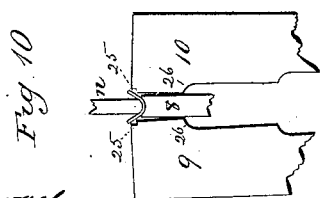
Witnesses
J. H. Shumway
Fred C. Earle
Joseph Nutt, Inventor,
By Atty.

J. NUTT.
MACHINE FOR APPLYING CLASPS TO HAT WIRES.
No. 379,876. Patented Mar. 20, 1888.
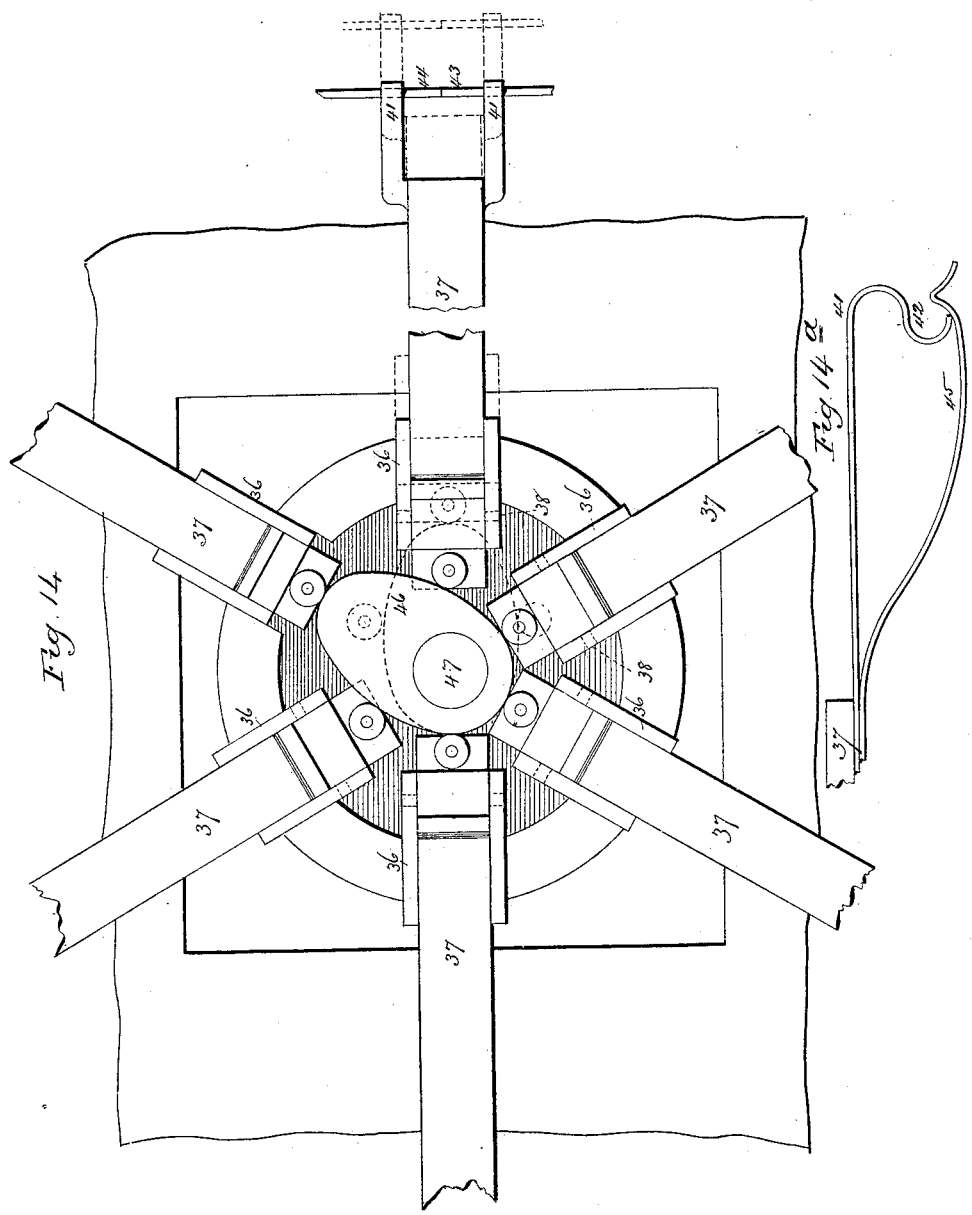

(No Model.) 8 Sheets—Sheet 8.
J. NUTT.
MACHINE FOR APPLYING CLASPS TO HAT WIRES.
No. 379,876. Patented Mar. 20, 1888.
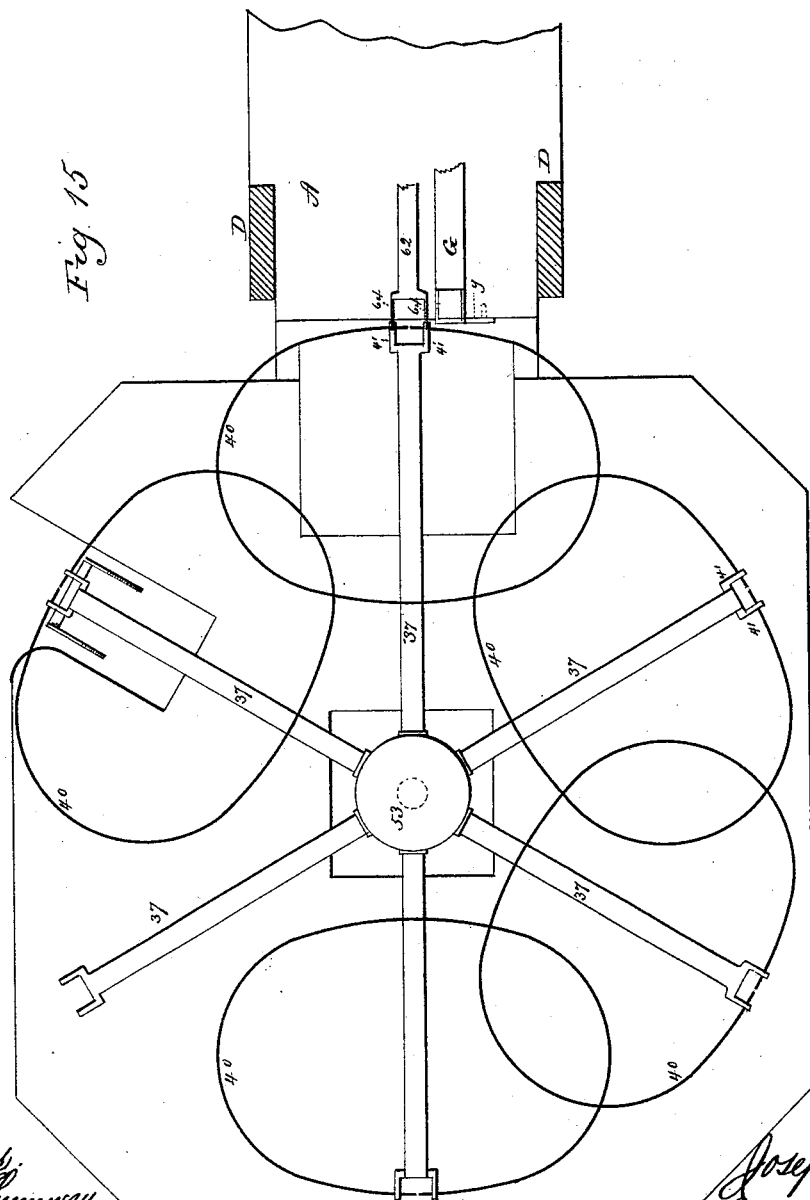

UNITED STATES PATENT OFFICE.

JOSEPH NUTT, OF DANBURY, CONNECTICUT.

MACHINE FOR APPLYING CLASPS TO HAT-WIRES.

SPECIFICATION forming part of Letters Patent No. 379,876, dated March 20, 1888.

Application filed October 24, 1887. Serial No. 253,174. (No model.)

*To all whom it may concern:*

Be it known that I, JOSEPH NUTT, of Danbury, in the county of Fairfield and State of Connecticut, have invented a new Improvement in Machines for Applying Clasps to Hat-Wires; and I do hereby declare the following, when taken in connection with accompanying drawings and the letters of reference marked thereon, to be a full, clear, and exact description of the same, and which said drawings constitute part of this specification, and represent, in—

Figure 1, a right-hand side view of the machine complete; Fig. 2, a front view of the same; Fig. 3, a rear view of the same; Fig. 4, an enlarged sectional view of the operative parts of the machine, the wire carrying and clasping apparatus being brought nearer together than represented in Fig. 1, for convenience of illustration; Fig. 5, a partial top view of the clasp-forming mechanism, the vertical slide and other portions removed for convenience of illustration; Figs. 6 and 7, detached views illustrating the feeding device; Fig. 8, a partial transverse section showing front view of the bender 9 and the mechanism for operating the benders; Figs. 9, 10, 11, 12, and 13, detached views illustrating the operation of forming the clasp and closing it upon the wire; Fig. 14, an enlarged view of the turn-table, the cam-plate removed to illustrate the movement of the wire-carrying arms; Fig. 14$^a$, an enlarged side view of the fingers, showing the spring to hold the wires in the fingers; Fig. 15, a top view of the wire-carrying table, showing the hat-wires as held by the fingers for presentation to the clasping mechanism.

This invention relates to the construction of a machine to automatically apply the clasps to hat-wires.

The hat-wires to which this invention particularly applies are designed to give shape to the brim of the hat, and are bent into the required shape for the periphery of the brim; also to give a vertical bend to produce the required dip at the front and rear.

Numerous machines have been made adapted to feed the wire and bend it into the requisite shape and cut it off at the required length, delivering the wire from the machine, but with its ends separated. These ends are required to be firmly secured together, and they are thus secured by applying to the meeting ends of the wire a U-shaped metal clasp which is of sufficient length to extend onto both ends of the wire, and then the legs of the U closed down, so as to completely encircle and secure the two ends. This clasping has usually been done by forming the clasps by hand, placing the clasps in a suitable press, then by hand presenting the hat-wire in proper position to the clasp, and then, by means of the foot, produce the closing operation.

The object of my invention is to construct a machine which will automatically shape the clasp, present the wire to the clasp, and close the clasp upon the wire; and the invention consists in the construction and combination of mechanism, as hereinafter fully described, and particularly recited in the claims.

A represents the bed of the machine, which is supported upon suitable legs, B, and carries the operative mechanism; C, the driving-shaft, which is supported on uprights D D, and to which power is applied through a pulley, E, or otherwise. These uprights carry a vertical slide, F, which is operated from the driving-shaft in the same manner as the vertical slide of punching-presses. In fact, the vertical slide F, the uprights D D, driving-shaft, and pulley, with the base, form substantially what is commonly known as a "power-press," a crank or eccentric on the driving-shaft imparting a vertical reciprocating movement to the slide F. The metal from which the clasps are to be made is cut in strips of a width corresponding to the length of the clasps required.

G is the feed-slide, (see Fig. 6,) which is arranged in suitable guides in the bed A, and so as to reciprocate in a horizontal plane and longitudinally—that is, from rear toward the front and return. The reciprocating movement is imparted to the feed-bar G from the driving-shaft C through a vertical countershaft, H, hung in bearings I I on the frame, connecting with the main shaft C by bevel-gears J J, as seen in Figs. 1 and 2.

On the shaft H is a cam, K, which imparts oscillation to a horizontal shaft, L, through a lever, M. The shaft L is parallel with the feed-bar G. At right angles to the shaft L is a similar rock-shaft, N, and to which rocking motion is imparted from the shaft L by segment bevel-gears O. (See Figs. 5 and 6.) The shaft N carries an arm, P, which extends upward into connection with the feed-bar G, and so that oscillatory movement of the shaft L imparted by the cam K will communicate a corresponding reciprocating movement to the feed-bar G. At its forward end the feed-bar G carries a clamping-block, Q, between which and the feed-bar G the strip of metal is introduced, as represented in Fig. 6, R indicating the strip of metal, and in said Fig. 6 the feed is represented as in the forward position, with the block Q as clamping the strip upon the bar G. The clamping of the block Q is produced by a two-armed lever, S T, hung upon a fulcrum, U, on the frame, the arm T extending upward in rear of the slide F of the press. The slide carries an arm, V, which extends to the rear of the arm T of the lever S T, and this arm carries a roller, W, adapted to bear upon the back of the arm T, as represented in Fig. 6, and so as to hold the arm T forward. The arm S of the said lever bears upon the upper surface of the block Q, as also seen in Fig. 6, when the arm T is thus held forward; but as the slide F descends, and after a piece has been cut from the strip for a clasp, the roller W comes into line with a recess, $a$, in the back of the arm T, which will permit the arm T to turn rearward, and so as to relieve the block Q from the pressure of the arm S; then the feed-bar G with its block Q are free to return without effect upon the strip; but when the slide F next commences its ascent the roller W rides upward from the recess $a$ and acts as a cam upon the arm T to force it forward and again force the block Q upon the strip, and so as to clamp the strip between the block and the feed-bar G, and so that when the feed bar next advances, the strip will be clamped between the block Q and the bar and be forced to move forward with the bar, to present its forward end to the cutters for a second clasp, and so on.

A cutter, $b$, is arranged in the bed (see Fig. 6) at right angles to and below the strip. On the slide F is a corresponding cutter, $d$, which, as the slide descends, will act in conjunction with the stationary cutter $b$ and cut off the projecting portion $e$ of the strip and force that strip down into a recess, $f$, forward of the stationary cutter $b$, as indicated in broken lines, Fig. 6. The piece of metal thus cut from the strip is of the shape required for the clasp, its width being substantially equal to the circumference of the wire upon which it is to be placed.

To hold the strip of metal while being cut, a clamp, $g$, is hung to the frame upon a pivot, $h$, and so as to swing in a vertical plane. (See Figs. 5, 6, and 8.) The free end of this clamp stands over the stationary cutter $b$, and on its back is an upwardly-projecting cam-shaped arm, $i$, which stands in the path of a roller, $l$, projecting downward from the slide F, (see Fig. 8,) and so that as the slide descends the roller $l$ will strike the back of the arm $i$ and force the clamp $g$ down upon the strip, so as to clamp it upon the cutter, and this clamp $g$ will hold upon the strip while the cutting is being performed, and will also hold the end of the strip during the return of the feed-bar, so as to avoid the possibility of a return movement of the strip with the feed-bar; but soon after the return of the feed occurs the roller $l$ rises from the arm $i$, leaving the clamp $g$ free, so that in the next advance of the feed-bar the strip will be free to advance with it.

A spring may be applied, as indicated in Fig. 8, which will tend to lift the clamp $g$ from the strip when the said clamp is free from the action of the roller $l$.

The blank for the first clasp now lies in the recess $f$, and is represented at $m$, Fig. 8. The recess $f$ is transversely across the bed parallel with and beneath the slide F. The slide F carries the punch $n$, which is to bring the blank into U shape, and this punch stands over the recess or groove $f$. It is now necessary to transfer the blank $m$ to a position beneath the punch $n$, and as indicated in Fig. 8. This transfer is produced by means of a sliding finger, $r$, which is arranged to reciprocate in the groove $f$, in which the blank stands, and as indicated in Fig. 8, and so that at the proper time the finger advances and forces the blank $m$ forward to its proper position beneath the punch $n$, as indicated in broken lines, Fig. 8; then the finger returns for a second blank, and so on.

The reciprocating movement is imparted to the finger $r$ from a shaft, $s$, supported in bearings $t$, (see Fig. 1,) and to which rotation is communicated from the shaft H by means of bevel-gears $u$.

A bell-crank lever, $w$ $v$, is hung upon a fulcrum, 2, below the finger $r$, the finger being hung to the upper end of the arm $w$. To the arm $v$ an arm, 3, is hung, which extends down and so as to ride upon a cam, 4, on the shaft $s$, the arm 3 being supported by a link, 5, as seen in Fig. 8, and so that at the proper time the cam 4 raises the arm 3, causing it to turn the bell-crank lever $v$ $w$ and force the finger $r$ forward, as indicated in broken lines, Fig. 8; then as the cam-arm 3 falls from the cam 4, as indicated in Fig. 8, the finger $r$ returns, which may be facilitated by the action of a spring. (Not shown.) The spring 6 is hung to the forward side of the head 7, which carries the finger $r$, and so as to press the finger down upon the bottom of the groove $f$, so that it may ride freely thereon.

The punch $n$ is of a width corresponding to the length of the clasp and of a thickness corresponding substantially to the diameter of the wire. Its lower edge is semicircular in transverse section, as indicated in Fig. 9.

Directly below the punch, and in the same plane with it, is a stationary blank-support, 8, (see Figs. 4 and 8,) and so that the blank $m$, when brought to a position below the punch, will lie upon the support 8. The two benders 9 and 10 are arranged the one forward and the other back of the supporter 8, as seen in Fig. 4. The two benders are hung below, upon a common axis, 11, in a vertical slide, 12, as seen in Fig. 4, and so that a vertical reciprocating movement may be imparted to the said benders, as from the position indicated in Fig. 9 to that indicated in Fig. 13, and return.

The vertical reciprocating movement is imparted to the slide 12 and to the benders 9 10 through a cam, 13, on the shaft s, which works between two arms, 14 and 15, of a lever, 16, hung upon a fulcrum, 17, so that a positive up-and-down swinging movement is imparted to the lever 16, and the slide 12 is hung to the lever 16 by a link, 18. (See Fig. 8.)

The benders 9 10 have a swinging movement toward or from each other, as from the position seen in Fig. 9 to that in Fig. 13, and return. Such swinging movement is imparted to the benders through slides 19 and 20, arranged to bear, respectively, upon the back of the benders 9 10, as seen in Fig. 4. A reciprocating movement is imparted to these slides 19 and 20 through levers respectively 21 and 22, hung in the bed, these levers being actuated, respectively, by cams 23 and 24 on the shaft s. (See Fig. 1.)

The blank is delivered upon the supporter 8 and between shoulders 25 on the respective benders 9 10, as seen in Fig. 9. Then the benders remaining stationary, the punch n descends and clamps the blanks between its lower end and the upper surface of the supporter 8, the upper edge of that supporter being correspondingly concave, as seen in Fig. 10. Then the benders 9 and 10 rise, as indicated in Fig. 10, and at the same time are forced toward each other by the slides 19 and 20, continuing their upward movement until the blank is brought into U shape, as indicated in Fig. 11. At this time the working faces of the benders have risen close up to the upper edge of the sides of the blank. The punch n now rises, leaving the blank between the benders and on the supporter, as represented in Fig. 12. At the lower edge of these faces shoulders 26 are formed, which correspond each to one half the circumference of the complete clasp, as seen in Fig. 13, while the benders stand in the position represented in Fig. 11. The meeting ends of the wire are introduced between the benders and into the U-shaped blank, as seen in Fig. 12, 27 representing the wire. This done, the benders are forced close together to bend the sides of the blank over the wire, and at the same time a downward force is applied to the benders, which brings them hard down upon the upper meeting sides of the clasp, as seen in Fig. 13, and so as to firmly close the clasp upon the wire. The work is now complete. The benders separate and return to the down position, ready to receive a second clasp, bend it to U shape, receive the wire between them and into the clasp, and close the clasp thereon, as before described.

To automatically present the hat-wire to receive the clasps, a turn-table, 28, is arranged upon the tubular vertical shaft 29, supported in a suitable bearing, 30, and to which an intermittent rotation is imparted by means of an eccentric, 31, on the shaft s. (See Fig. 3.) On the shaft 29 is a loose sleeve, 32, (see Fig. 4,) to which oscillatory movement is imparted by a connecting-rod, 33, from said eccentric 31. The sleeve carries a pawl, 34, which engages the teeth of a ratchet, 35, made fast to the shaft 29, which carries the turn-table 28, and so that by each revolution of the eccentric 31 one step in advance will be imparted to the said turn-table 28. The said turn-table carries a series of radial slides, 36. (See Fig. 14.) In each of these slides a radial arm, 37, is hung upon a pivot, 38, so that said arms may swing up and down. Springs 39 are arranged, the tendency of which is to draw the slides and the arms which they carry toward the center of the turn-table. The arms 37 are each adapted to receive a hat-wire, as seen in Fig. 15, 40 representing the hat-wires. The outer ends of the arms terminate, as seen in Figs. 14 and 14ª, in a pair of fingers, 41, distant from each other little more than the length of the clasp to be applied to the wires. The ends of these fingers have a curved transverse recess, 42, (see Fig. 14ª,) adapted to receive the meeting ends of the wires, as seen in Fig. 14, 43 and 44 representing the two ends of a wire so placed in the fingers; and to hold the wire so placed in the fingers a spring, 45, is applied to the finger ends of the arms, over the nose of which the wires pass into the recesses 42, the spring yielding for the insertion of the wires, and then the nose rises upon the outside of the wires, so as to substantially clamp them into the fingers 41, and so as to securely hold the wires with the meeting ends 43 44 between the said fingers 41, and as seen in Fig. 14, and as also indicated in Fig. 15. The wires thus held by the arms 37 are carried by the rotation of the turn-table until the meeting ends of the first wire so introduced are brought into a position in line with the punch n, as represented in Fig. 4, but a short distance from the punch. The slide 36, which carries the arm holding the wire, as last described, is advanced, as indicated in broken lines, Fig. 14, which brings the wire directly into line between the punch and the supporter 8 below it. The slide and arm carrying the wire are thus advanced by means of a cam, 46, on a shaft, 47, which works through the tubular shaft 29, which carries the turn-table, and to this shaft 47 an oscillating movement is imparted from a cam, 48, on the shaft s, which, through a lever, 49, actuates a rock-shaft, 50, carrying a bevel-segment, 51, which works into a corresponding bevel-gear, 52, on the shaft 47. (See Fig. 3.) The oscillation of the cam 46 is from the position seen in Fig. 14 to the position seen in broken lines, same figure. The arm carrying the wire, as seen in Fig. 14, coming into the proper position, the cam 46 acts against the inner end of the slide 36, advances the arm 37, and with it the wire, as indicated in broken lines in said Fig. 14.

The turn-table 28 carries a plate, 53, as practically a part of it, which plate is above the slides 36, and upon its under face is provided with cams 54, which correspond to each of the arms 37, and each of the said arms is provided with like cam-surfaces, 55, forward of its pivot 38, which normally stand inside the cam 54 of the turn-table, but so that as the slide 36 advances, carrying the arm outward, the cam-surface 55 of the arm passes under the cam 54, causing the outer end of the arm to be depressed. The arm 37 is supported upon a spring, $x$, (see Fig. 4,) but which may yield for its depression. On the under side of the arm is a shoulder, $y$, which, as the arm 37 advances, strikes a corresponding shoulder, $z$, of the spring, and the shoulder $z$ of the spring and the shoulder $y$ of the arm engaging, the further advance of the arm causes the spring to turn downward, as indicated in broken lines, Fig. 4. This depression occurs during the advance movement of the arm, and causes the outer end of the arm carrying the wire to descend, as from the position seen in Fig. 4 to that seen in Fig. 12, and so as to bring the ends of the wire carried by the fingers into the U-shaped blank, the fingers passing down upon the respective sides of the benders and of the supporter, and so that the said fingers hold the wire in the proper position for the closing of the clasp, and while in this position the closing operation heretofore described is performed upon the clasp. Then, after the closing of the clasp has been performed, the cam 46 returns to the position indicated in Fig. 14, permitting the slide 36, with the arm 37, to return and take the wire with the clasp upon it from the supporter 8. Then a rotative step is imparted to the turn-table, taking the wire so clasped away from the clasping device and presenting a second arm with its wire for a like operation. In the movement of the arm carrying the clasped wire, the slide works against the surface of the cam 46 as if it were a stationary cam, and consequently another outward movement will be imparted to the slide and the arm, as seen in Fig. 14; but this is incidental to the arrangement of the cam and not essential to the operation of the machine, this second outward movement of the arm performing no necessary office. The clasped wire is now ready to be discharged from the machine. To hold the table firmly in the position for the introduction of the wires to the clasp, I arrange a locking-dog in the form of a lever, 56, which is actuated by a cam, 57, on the shaft $s$, arranged so that the said lever will drop into a notch in the ratchet 35 under the action of a weight, as shown, or other suitable yielding force, when the table has reached a position for the presentation of the wires, but from which notch the dog will be lifted by the cam 57 after the clasping operation has been performed, and so as to permit the next step in the rotation of the table.

The removal of the finished wires from the machine may be done by hand, but I prefer to do it automatically; and to this end I arrange a finger, 58, in the form of a bell-crank lever, in a position corresponding to one of the arms 37 when in a state of rest and after the clasping operation has been performed. This ejecting-finger is arranged below the path of the arms 37, but so as to swing up between the fingers and inside the clasp portion of the wire, and as indicated in broken lines, Fig. 3, and so that when the clasped wire is brought into the path of the finger 58 that finger is thrown upward and outward, as indicated in broken lines, Fig. 3, in which movement it strikes the clasped wire and forces it from the fingers which hold it. This ejecting movement is imparted to the finger 58 from the dog 56 through a lever, 59, link 60 connecting said lever 59 with an arm, 61, which is rigidly fixed to the dog 56.

To insure the descent of the wire fully down into the U-shaped blank, I arrange an arm, 62, hung upon the bed at the rear of the punch, as at 63, (see Figs. 4 and 5,) the said arm extending forward and terminating in a pair of fingers, 64, one each side the punch and corresponding to the fingers 41, which carry the wire, but normally standing so far above the supporter 8, as seen in Fig. 4, as to permit the fingers of the arm 37 to pass below the fingers 64. A vertical rod, 65, standing over the arm 62, as seen in Fig. 4, receives a vertical downward movement from a cam, 70, on the driving-shaft C, and which strikes the back of the arm 62 and forces it downward. The fingers 64 strike the top of the fingers 41 and press them downward, as seen in Fig. 12. The arm 62 is provided with a spring, 66, which yields under its descent, then under its reaction returns the arm.

To permit the fingers, 41, carrying the wire to pass down each side the benders, it is necessary that a corresponding recess shall be made in the bed, as represented at 67 and 68, Fig. 8. This would necessarily leave an open space, 68, over which the blank must pass in coming to its position over the supporter 8 and the benders 9 and 10, and which open space would be liable at times to interfere with the proper advance of the blank. To avoid the possibility of such interference, I introduce a plate, 69, which corresponds to the opening 68, as seen in Fig. 8, and this plate I attach to the fingers 64 on that side of the punch, as seen in Figs. 8 and 9, and so that while the fingers 64 stand in the up position the plate 69 closes the opening 68, leaving a flush surface, over which the blank will slide; but when the finger 64 is depressed, as before described, then the plate 69 drops with it into the recess below, as represented in broken lines, Fig. 9, and out of the way of the wire-carrying fingers.

It will be evident that the mechanism which I have described for presenting the wires may be omitted entirely and the wires introduced to their proper position by hand; hence I do not wish to be understood as limiting the clasping part of the invention to the necessary employment of an automatic presentation of the wires.

The feed-bar and the clamp-bar upon it, to grasp the strip in its forward movement and be relieved from the strip on the return movement, is a common and well-known feeding device, and for it may be substituted any of the many known devices adapted to feed the strip into the machine.

The clasps may be first bent into U shape and introduced between the benders, as represented in Fig. 12, in which case, it will be understood, the feeding and cutting mechanism is to be omitted.

The up-and-down movement required to be imparted to the wire-carrying fingers may be produced by the fingers of the vertically-swinging bar 62, in which case the cams 54 55 may be omitted, the fingers passing directly under the fingers 64, and so that as the fingers 64 descend they will force the fingers 41 and the wire they carry to the downward position, the spring $x$ yielding for this purpose.

I claim—

1. The combination of an intermittent feed adapted to carrying a strip of metal, a vertically-reciprocating slide above said feed, a stationary cutter in advance of said feed, a corresponding cutter applied to said slide, a stationary supporter, 8, a punch in said vertical slide over and corresponding to said supporter 8, benders 9 10, arranged on opposite sides of said supporter 8, mechanism, substantially such as described, to impart a combined up-and-down and forward-and-back movement to said benders, with a reciprocating finger, $r$, arranged to work forward of said stationary cutter and in a plane parallel therewith, substantially as and for the purpose described.

2. The combination of an intermittent feed adapted to carry a strip of metal, a vertically-reciprocating slide, F, carrying a cutter, $d$, and punch $n$, stationary cutter $b$, corresponding to the cutter $d$ of the slide, the stationary supporter 8, the benders 9 10, arranged upon opposite sides of said supporter 8, with mechanism for imparting a combined up-and-down and forward-and-back movement to said benders, a reciprocating finger, $r$, and the clamp $g$, substantially as and for the purpose described.

3. The combination of a stationary supporter, 8, corresponding reciprocating punch, $n$, benders 9 10, arranged upon opposite sides of said supporter, mechanism for imparting combined up-and-down and forward-and-back movement to said benders, rotating arms 37, terminating in fingers 41, distant from each other substantially the width of the supporter 8, the said fingers being adapted to receive and carry a hat-wire, with mechanism, substantially such as described, to impart a rotative forward-and-back and up-and-down movement to said fingers, substantially as described, and whereby the hat-wire carried by the fingers is presented between the said supporter 8 and the punch $n$.

4. The combination of an intermittent feed adapted to carry a strip of metal, a stationary cutter, $b$, stationary supporter 8, reciprocating cutter $d$, and reciprocating punch $n$, corresponding to the stationary supporter 8, benders 9 10, arranged upon opposite sides of said supporter 8, mechanism, substantially such as described, to impart a combined up-and-down and forward-and-back movement to said benders, rotating radial arms 37, carrying fingers 41, the said fingers distant from each other corresponding to the width of said supporter 8, the said fingers adapted to receive and carry a hat-wire, mechanism, substantially such as described, to impart a rotative forward-and-back and up-and-down movement to said fingers, vertical swinging arms 62, carrying fingers 64, corresponding to the said fingers 41, substantially as and for the purpose described.

5. The combination of an intermittent feed adapted to receive and carry a strip of metal, a stationary cutter, $b$, corresponding reciprocating cutter $d$, stationary supporter 8, corresponding punch, $n$, benders 9 10, arranged upon opposite sides of said supporter 8, mechanism, substantially such as described, to impart a combined up-and-down and forward-and-back movement to said benders, reciprocating fingers $r$, intermittently-rotating radial arms 37, carrying fingers 41, distant from each other corresponding to the width of said supporter 8, mechanism, substantially such as described, to impart a rotative forward-and-back and up-and-down movement to said fingers, said fingers being adapted to receive and carry a hat-wire, with the plate 69, arranged upon the feed side of said benders and adapted for up-and-down movement, substantially as and for the purpose described.

6. The combination of a stationary supporter, 8, benders 9 10, arranged upon opposite sides of said supporter, mechanism to impart to said benders a combined up-and-down and forward-and-back movement, punch $n$, corresponding to said supporter 8, a turn-table, 28, radial slides 36, arranged thereon, radial arms 37, hung in said slides and adapted for an up-and-down swinging movement, the said arms carrying fingers 41, distant from each other corresponding to the width of the supporter 8, and the said fingers adapted to receive and carry a hat-wire, with a cam, 46, arranged to work against said slides, and whereby an outward movement is imparted to said arms when in line with said punch and supporter, substantially as described.

7. The combination of a stationary supporter, 8, benders 9 10, arranged upon opposite sides of said supporter, mechanism to impart to said benders a combined up-and-down and forward-and-back movement, punch n, corresponding to said supporter 8, a turn-table, 28, radial slides 36, arranged thereon, radial arms 37, hung in said slides and adapted for an up-and-down swinging movement, the said arms carrying fingers 41, distant from each other corresponding to the width of the supporter 8, and the said fingers adapted to receive and carry a hat-wire, with a cam, 46, arranged to work against said slides, and a cam, 54, on said turn-table, and corresponding cam, 55, on the adjacent surface of said arm 37, with a yielding spring arranged to support said arm against said cam 54, all substantially as described.

8. The combination of a stationary supporter, 8, benders 9 10, arranged upon opposite sides of said supporter, mechanism to impart to said benders a combined up-and-down and forward-and-back movement, punch n, corresponding to said supporter 8, a turn-table, 28, radial slides 36, arranged thereon, radial arms 37, hung in said slides and adapted for an up-and-down swinging movement, the said arms carrying fingers 41, distant from each other corresponding to the width of the supporter 8, and the said fingers adapted to receive and carry a hat-wire, with a cam, 46, arranged to work against said slides, and an ejecting-lever, 58, substantially as and for the purpose described.

9. The combination of a stationary supporter, 8, benders 9 10, arranged upon opposite sides of said supporter, mechanism to impart to said benders a combined up-and-down and forward-and-back movement, punch n, corresponding to said supporter 8, a turn-table, 28, radial slides 36, arranged thereon, radial arms 37, hung in said slides and adapted for an up-and-down swinging movement, the said arms carrying fingers 41, distant from each other corresponding to the width of the supporter 8, and the said fingers adapted to receive and carry a hat-wire, with a cam, 46, arranged to work against said slides, and the vertically-swinging arm 62, terminating in fingers 64, said fingers corresponding to the said fingers 41 and adapted to bear thereon, substantially as and for the purpose described.

JOSEPH NUTT.

Witnesses:
  CHESTER C. BRUSH,
  LUMAN L. HUBBELL.